United States Patent
Jensen et al.

(10) Patent No.: US 10,682,826 B2
(45) Date of Patent: Jun. 16, 2020

(54) PLATFORM FOR VALIDATING MATERIALS AND CUTTING PROTECTIVE COVERS

(71) Applicant: Madico, Inc., Woburn, MA (US)

(72) Inventors: Peter Jensen, Morgan Hill, CA (US); Bradley Bacigalupi, Provo, UT (US)

(73) Assignee: MADICO, INC., Pinellas Park, FL (US)

( * ) Notice: Subject to any disclaimer, the term of this patent is extended or adjusted under 35 U.S.C. 154(b) by 997 days.

(21) Appl. No.: 14/589,646

(22) Filed: Jan. 5, 2015

(65) Prior Publication Data
US 2015/0190978 A1   Jul. 9, 2015

Related U.S. Application Data (60) Provisional application No. 61/924,095, filed on Jan. 6, 2014.

(51) Int. Cl.
| | |
|---|---|
| *B31B 50/20* | (2017.01) |
| *B26F 1/38* | (2006.01) |
| *B26D 5/00* | (2006.01) |
| *G05B 19/418* | (2006.01) |
| *B31B 70/20* | (2017.01) |
| *B31B 70/00* | (2017.01) |
| *B26D 7/01* | (2006.01) |

(52) U.S. Cl.
CPC .............. *B31B 50/20* (2017.08); *B26D 5/00* (2013.01); *B26D 5/005* (2013.01); *B26D 5/007* (2013.01); *B26D 7/01* (2013.01); *B26F 1/38* (2013.01); *G05B 19/4183* (2013.01); *B31B 70/006* (2017.08); *B31B 70/20* (2017.08); *Y02P 90/10* (2015.11)

(58) Field of Classification Search
CPC . B26D 5/00; B26D 7/01; B26D 5/005; B26D 5/007; B26F 1/38; B31B 1/20; B31B 70/006; B31B 7/20; B31B 50/20; G05B 19/4183; Y02P 90/10
See application file for complete search history.

(56) References Cited

U.S. PATENT DOCUMENTS

| | | |
|---|---|---|
| 1,247,051 A | 11/1917 | Wilson |
| 1,587,133 A | 6/1926 | Anhof |
| (Continued) | | |

FOREIGN PATENT DOCUMENTS

WO   2015103625   7/2015

OTHER PUBLICATIONS

International Search Report and Written Opinion for PCT/US2015/010351 dated May 6, 2015.

(Continued)

*Primary Examiner* — Jennifer L Norton
(74) *Attorney, Agent, or Firm* — Michael E. Dockins; Shumaker, Loop & Kendrick, LLP (57) ABSTRACT

Systems and methods for communicating cutting instructions for cutting a protective cover for a personal device, and for validating protective cover materials prior to cutting the protective cover in order to prevent unauthorized and/or improper use of the protective cover materials. Systems and methods for cutting a protective cover for a personal device after validating protective cover materials and receiving cutting instructions based on a user-selected personal device for which a protective cover is desired.

19 Claims, 10 Drawing Sheets

(56) References Cited

U.S. PATENT DOCUMENTS

| | | | |
|---|---|---|---|
| 1,862,897 A | 6/1932 | Klie | |
| 2,108,295 A | 2/1938 | Prucha | |
| 2,517,159 A | 8/1950 | Allen | |
| 2,534,961 A | 12/1950 | Dunn | |
| 3,766,654 A | 10/1973 | Canton | |
| 4,098,160 A | 7/1978 | Weil | |
| 4,230,164 A | 10/1980 | Mericle | |
| 4,584,780 A | 4/1986 | Pressey | |
| 4,591,295 A | 5/1986 | Collipp | |
| 5,347,724 A | 9/1994 | Hankins | |
| D361,533 S | 8/1995 | Kerry | |
| D364,932 S | 12/1995 | Tinen | |
| D367,120 S | 2/1996 | Tinen | |
| 5,577,328 A | 11/1996 | Kerry | |
| 6,157,868 A * | 12/2000 | Abe | B26D 5/00 700/131 |
| D448,406 S | 9/2001 | Lariviere, Jr. et al. | |
| 6,317,952 B1 | 11/2001 | Vogt | |
| D508,861 S | 8/2005 | Zavala | |
| 7,100,295 B1 | 9/2006 | Chang | |
| D549,115 S | 8/2007 | Tucker | |
| D577,617 S | 9/2008 | Tucker | |
| D601,442 S | 10/2009 | Haren | |
| D608,668 S | 1/2010 | Tucker | |
| 7,770,303 B2 | 8/2010 | Graham et al. | |
| D625,623 S | 10/2010 | Smink | |
| 7,918,032 B2 | 4/2011 | Zaremski | |
| D640,941 S | 7/2011 | Tucker | |
| D684,487 S | 6/2013 | Tucker | |
| D688,574 S | 8/2013 | Tucker | |
| 8,676,366 B2 * | 3/2014 | Ganci | B26D 5/00 313/582 |
| D724,966 S | 3/2015 | Tucker | |
| 29,532,356 | 4/2015 | Bacigalupi | |
| 9,333,663 B2 * | 5/2016 | Okuyama | B26D 5/00 |
| 10,459,256 B2 * | 10/2019 | Fonte | G02C 7/027 |
| 2002/0123821 A1 * | 9/2002 | Ramsey | A41H 1/02 700/131 |
| 2004/0006571 A1 * | 1/2004 | Anagol-Subbarao | G06F 17/30867 |
| 2005/0116334 A1 | 6/2005 | Buehler | |
| 2007/0214491 A1 | 9/2007 | Serani et al. | |
| 2008/0103622 A1 * | 5/2008 | Hanses | G05B 19/4183 700/116 |
| 2008/0237343 A1 * | 10/2008 | Muraki | G06Q 10/08 235/435 |
| 2009/0113737 A1 | 5/2009 | Graham et al. | |
| 2010/0125354 A1 * | 5/2010 | Knipfer | G05B 19/41865 700/95 |
| 2010/0214607 A1 | 8/2010 | Hepworth | |
| 2011/0048256 A1 | 3/2011 | Atta et al. | |
| 2011/0048266 A1 | 3/2011 | Crystal et al. | |
| 2011/0056348 A1 | 3/2011 | Birch et al. | |
| 2011/0122212 A1 | 5/2011 | Pettersson et al. | |
| 2013/0042581 A1 | 2/2013 | Holben et al. | |
| 2013/0080293 A1 * | 3/2013 | Khin | G06Q 30/06 705/26.81 |
| 2013/0144416 A1 * | 6/2013 | Rataul | G05B 19/41805 700/95 |
| 2013/0184845 A1 | 7/2013 | Hales | |
| 2017/0153616 A1 * | 6/2017 | Sakakibara | G05B 19/048 |
| 2020/0112330 A1 * | 4/2020 | Russo | C08G 18/44 |

OTHER PUBLICATIONS

Office action for application No. 29/532,356 dated Nov. 24, 2015.
U.S. Appl. No. 29/496,177, filed Jul. 10, 2014, Bacigalupi.
U.S. Appl. No. 29/496,177, Apr. 6, 2015, Office Action.
U.S. Appl. No. 29/496,177, Nov. 28, 2014, Notice of Allowance.

* cited by examiner

PLATFORM FOR VALIDATING MATERIALS AND CUTTING PROTECTIVE COVERS

CROSS-REFERENCE TO RELATED APPLICATIONS

This application is a non-provisional application claiming priority under 35 U.S.C. §119(e) to U.S. Patent Application Ser. No. 61/924,095, filed on Jan. 6, 2014 and titled "PLATFORM FOR CUTTING CUSTOM PROTECTIVE FILMS," which application is expressly incorporated herein in its entirety by this reference.

BACKGROUND

In recent years, there has been a marked increase in the use of personal computing devices, such as laptop computers, tablets, smartphones, smart watches, personal media players, etc. As the use of personal computing devices has increased, and the industrial design of these devices has been refined, so has the desire by users to protect their devices from scratches, dents, dings, etc. that can occur as these devices are put through their daily use. To answer the desire of users to protect their devices, many companies now provide protective covers (e.g., plastic films, glass, etc.) that are cut and sized to precisely fit most personal computing devices, and that users can adhere to their devices to offer protection to those devices.

In view of the sheer number and variety of personal computing devices on the market, manufacturers must design and produce (and retailers must stock) a wide variety of protective covers to answer consumer demand. Since the personal electronics industry is constantly changing, manufacturers are constantly creating new designs to support new devices. For some devices, manufacturers may only be able to create designs after the devices are already on the market. At the same time, as older devices become less popular, demand for protective covers for those devices can quickly diminish. Because of the constant change within the personal electronics industry, it can be difficult (e.g., in terms of manufacturing and shipping capacity, retail space, stocking, etc.) for manufacturers and retailers to create and stock the correct spectrum of protective covers for the devices that are in popular demand, while also supporting the ever-growing collection of older and less popular devices.

BRIEF SUMMARY

The present disclosure describes systems and methods for communicating cutting instructions for cutting a protective cover (e.g., plastic film, glass) for a personal device (e.g., laptop, mobile phone, tablet), for validating protective cover materials prior to cutting the protective cover in order to prevent unauthorized and/or improper use of the protective cover materials, and for cutting a protective cover for a personal device.

Certain embodiments describe methods for validating protective cover materials and communicating protective cover cutting instructions to a cutting machine at a remote location by receiving an identity of a user selected personal device for which a protective cover is desired and a unique identifier associated with a protective cover blank present at a remote location, based on the unique identifier, validating that the protective cover blank is an authorized protective cover blank, then based on the identified personal device and on the protective cover blank being an authorized protective cover blank, sending cutting instructions to the remote location, the remote location including a cutting machine, the cutting instructions instructing the cutting machine how to transform the protective cover blank by cutting the protective cover blank so that it fits a device of the personal device type.

Certain embodiments describe methods for cutting a protective cover for a personal device by presenting, at a user interface, a plurality of different personal device types that are associated with available protective covers, receiving, at the user interface, a selection of a particular one of the plurality of different personal device types, receiving a unique identifier associated with a protective cover blank, sending, to a server computer system, a personal device type identification corresponding to the particular one of the plurality of different personal device types, sending, to the server computer system, the unique identifier associated with the protective cover blank, and based on sending the personal device type identification and the unique identifier to the server computer system, receiving cutting instructions for cutting the protective cover blank according to protective cover data associated with the personal device type identification, and sending the cutting instructions to a cutting machine, causing the cutting machine to transform the protective cover blank by cutting the protective cover blank so that it fits the particular one of the plurality of different personal device types.

BRIEF DESCRIPTION OF THE DRAWINGS

To further clarify the above and other advantages and features of the present disclosure, a more particular description of the invention will be rendered by reference to specific embodiments thereof which are illustrated in the appended drawings. It is appreciated that these drawings depict only illustrated embodiments of the invention and are therefore not to be considered limiting of its scope. Embodiments of the invention will be described and explained with additional specificity and detail through the use of the accompanying drawings in which.

DETAILED DESCRIPTION

The present disclosure describes systems and methods for communicating cutting instructions for cutting a protective cover for a personal device (e.g., laptop, mobile phone, tablet), for validating protective cover materials prior to cutting the protective cover in order to prevent unauthorized and/or improper use of the protective cover materials, and for cutting a protective cover for a personal device. Protective covers may be made from a variety of materials or combinations of materials, such as from plastic or resin sheets or films, or from glass, vinyl, polycarbonate, acrylic, cellulose acetate, acrylonitrile-butadine-styrene (ABS), nylon, polyethylene, polypropylene, polyurethane, carbon fiber, or other materials that are transparent or semi-transparent and is capable of being cut and sized so as to be used as a protective cover for a personal device.

Figure 1:
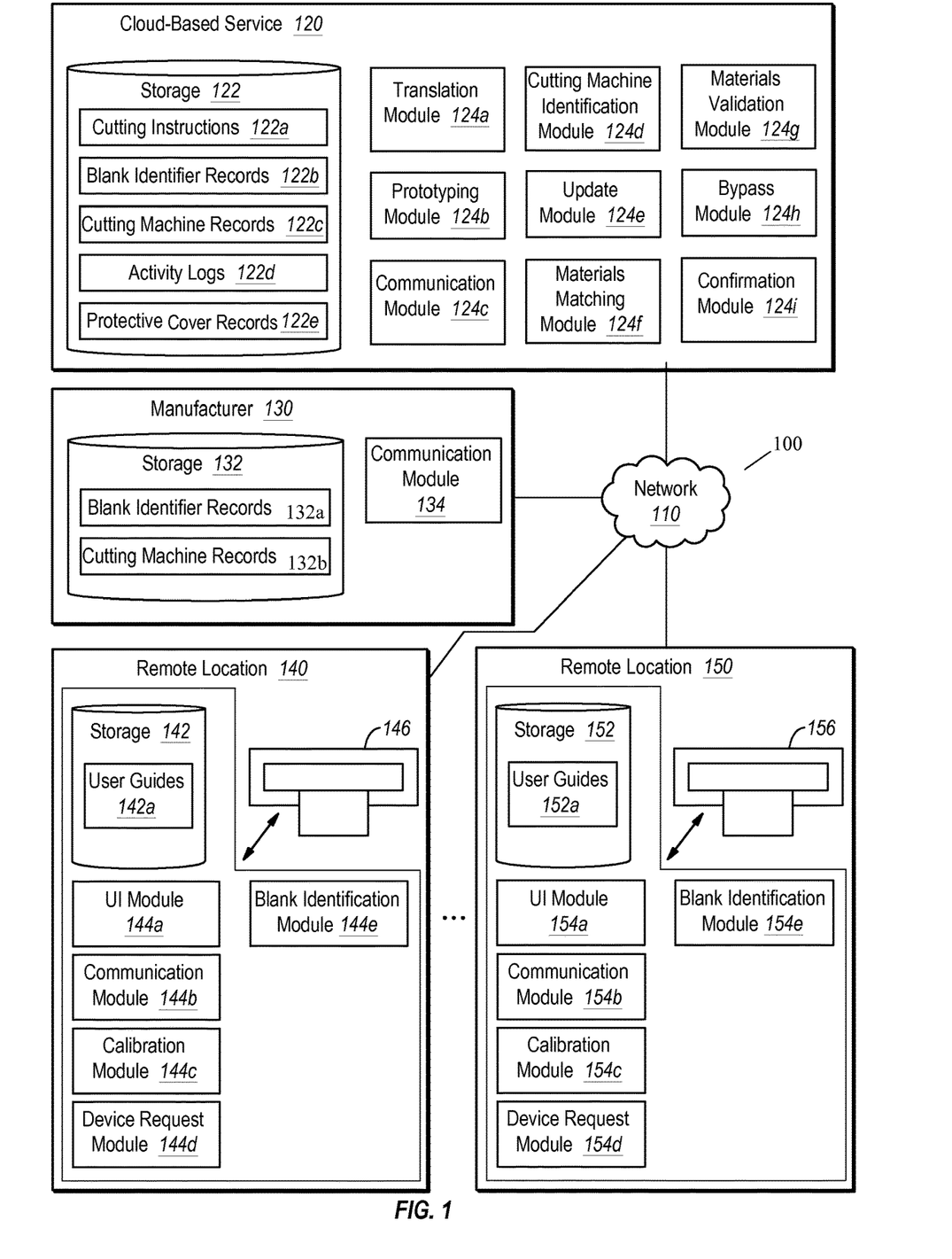
FIG. 1 illustrates a computing environment that can be used to validate protective cover materials and to communicate cutting instructions for cutting a protective cover.

FIG. 1 illustrates one embodiment of an architecture 100 in which protective cover materials can be validated (e.g., as being authorized) and in which cutting instructions for cutting a protective cover for a given personal device can be communicated to a cutting machine to produce a fitted protective cover for the personal device. The illustrated embodiment includes a cloud-based service 120, one or more computing systems of a manufacturer 130, and one or more cutting machines (e.g., 146, 156) in communication with one or more computers of a remote location (e.g., 140, 150). In some embodiments, the remote location computer systems (140, 150) connect to the cutting machines (146, 156) using a Universal Serial Bus (USB) connection. As such, the remote location computer systems (140, 150) may provide host-mode USB support.

As indicated by the horizontal ellipses, architecture 100 can include any number of remote locations, and any reference herein to any of the remote locations should be understood to include one or more of the remote locations. Each of the depicted computer systems is connected to one another over (or is part of) a network 110, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. over the network.

The cloud-based service 120 includes storage 122, which could comprise any appropriate form of a database (e.g., relational, flat, etc.). The storage 122 can be used for storing protective cover records 122e (e.g., protective cover designs based on different personal devices), cutting instructions 122a, activity logs 122d, cutting machine records 122c, and protective cover records 122e (e.g., protective cover blank identification records). The cloud-based service 120 can also include a communication module 124c that provides application programming interfaces (APIs) that enable manufacturer computer systems 130 and remote location computer systems (140, 150) to communicate and share data with the cloud-based service 120 (e.g., through communication modules 134, 144b, and 154b, respectively).

The cloud-based service 120 can also include a translation module 124a configured to translate protection cover records 122e into cutting instructions 122a suitable for being read by a cutting machine (146, 156). For example, protective cover records 122e may include design files related to protective covers and/or personal devices for which protective covers are designed. These design files may exist as CAD files, vector graphics, or other design files. The translation module 124a can convert these files or portions thereof into relatively simple cutting instructions 122a to be sent to the remote locations (140, 150). This can enhance the efficiency of the architecture 100 by reducing the amount of data that must be passed through network 110. Furthermore, computing systems at remote locations (140, 150) may have relatively limited processing and memory capabilities relative to the computing system of the cloud-based service 120. The computing environment is therefore improved by allowing the cloud-based service 120 to do the translation (as well as many of the other functions described herein), thereby relieving the remote location computer systems form performing such conversions and reducing the storage requirement at remote locations (140, 150).

The cloud-based service 120 can also include a cutting machine identification module 124d configured to identify a cutting machine (e.g., cutting machines 146, 156) based on a received cutting machine identifier (e.g., serial number). For example, the cutting machine identification module may compare a received cutting machine identifier with cutting machine records 122c to determine the identity of the cutting machine. In some embodiments, the cutting machine identification module can also compare other received information (e.g., subscription data, geographical location data, user/business information) to cutting machine records 122c in order to identify and/or verify a cutting machine.

The cloud-based service 120 can also include an update module 124e configured to send updates to one or more remote locations (140, 150) and/or to a manufacturer 130. For example, the update module 124e may send updates to a remote location (140, 150) listing additional available protective cover designs and/or additional personal devices with fitted protective cover designs available from the cloud-based service 120. Update information (as well as other data transferred between the cloud-based service 120 and a remote location 140, 150) can be provided using push mechanisms, pull mechanisms, or a combination thereof. For example, cloud-based service 120 may push new designs to remote location computer systems (140, 150) as they become available, may provide designs upon request.

The cloud-based service 120 can also include a materials matching module 124f configured to match an identified personal device (e.g., one selected by a user at a remote location 140, 150) with suitable protective cover material types and/or sizes for that identified personal device. For example, for a given personal device, there may be a selection of suitable protective cover materials that vary in size, thickness, color, opacity, composition (e.g., plastic, glass), etc. Similarly, there may be protective cover types and/or sizes that are inappropriate or unworkable with a given personal device. The materials matching module 124f can match the identified personal device to the set of suitable protective cover materials, and can send such information to the remote location (140, 150).

The cloud-based service 120 can also include a materials validation module 124g configured to compare a received protective cover blank identifier (explained in more detail below) with blank identifier records 122b, cutting machine records 122c, and/or activity logs 122d or other information in order to check whether a given protective cover blank is authorized for use. For example, a given protective cover blank may only be authorized for certain cutting machines, or for certain users/businesses, subscription plans, or geographic areas. Additionally, a given protective cover blank may only be authorized for single-time use. The materials validation module 124g can also be configured to send an approval or failure message and/or a request for additional information (e.g., a request for a photograph of the protective cover blank) to the relevant remote location (140, 150), or may be configured to send disable/lockout instructions to the remote location (140, 150) (e.g., after a failed validation).

The cloud-based service 120 can also include a bypass module 124h usable, for example, when a bypass to materials validation has been requested or when a materials validation has failed. In some embodiments, the bypass module 124h receives bypass information (e.g., a photograph of the protective cover blank and/or user provided reasons for requesting a bypass) and can compare the received information with blank identifier records 122b, cutting machine records 122c, and/or activity logs 122d or other information in order to determine whether a bypass request is appropriate. The bypass module 124h may also be configured to flag and/or deny any suspicious bypass requests (e.g., multiple requests originating from the same cutting machine and/or user, multiple requests within a given timeframe, requests with insufficient bypass information or explanation, or requests falling within other predefined criteria). Flagged requests may, for example, be reviewed by an operator and/or may be communicated to a manufacturer 130. In some embodiments, the bypass module 124h may be configured to send disable/lockout instructions to the remote location (140, 150) (e.g., after a denied bypass request).

The cloud-based service 120 can also include a confirmation module 124i configured to receive cut acceptability information following a cutting procedure at a remote location (140, 150) and to optionally send an acknowledgment message and/or to initiate a troubleshooting process.

The computer system of a manufacturer 130 can include storage 132 containing blank identification records 132a, cutting machine records 132b, and other data. For example, manufacturer 130 may manufacture cutting machines (or may repurpose cutting machines produced by other entities) such as cutting machines 146 and 156 for use in remote locations 140 and 150, respectively. Data related to such cutting machines (e.g., serial numbers, lease information, etc.) may be stored as cutting machine records 132b. Additionally, or alternatively, the manufacturer 130 may produce or provide protective cover blanks for use in the cutting machines (146, 156). In some embodiments, each protective cover blank is tagged with a unique identifier before being transferred to a remote location (140, 150), and such information can be stored as blank identifier records 132a. For example, each protective cover blank (or each pack thereof) may be tagged or labeled with a machine-readable code (such as a QR code, a barcode, or the like) uniquely identifying the protective cover blank (and additionally, optionally categorizing according to size, personal device type to which it may be applied, geographic area for which it is authorized, etc.). The manufacturer 130 may communicate blank identification records 132a, cutting machine records 132b, and other data to the cloud-based service 120. Though FIG. 1 illustrates the computer system of the manufacturer 130 and the cloud-based service 120 as separate systems, one of skill in the art will recognize that in some embodiments, they are combined as one computer system, since the same entity may operate both systems.

Using the computer system at remote location 140 as an illustrative example (while noting that the same description may apply to multiple remote locations), the computer system can include storage 142 containing user guides 142a (e.g., guides related to the computer system at the remote location 140, guides related to the cutting machine 146 associated with the remote location 140, guides related to protective cover blanks, the personal device selection process, the cutting process, etc.). The remote location 140 can include a user interface module 144a configured to present to a user at the remote location 140 a user interface on a display device for entering, receiving, and/or displaying information related to the selection of a personal device (e.g., a personal device for which a protective cover is desired), the selection of suitable protective cover blanks, the setup and operation of the cutting machine 146, troubleshooting, cutting machine calibration, materials validation, validation bypassing, activity logs, and other information related to the systems and methods disclosed herein.

In some embodiments, the remote location 140 includes a calibration module 144c configured to send calibration instructions and/or testing instructions/procedures to the cutting machine 146 and/or to display user instructions for adjusting cutting machine 146 (e.g., proper blade or other cutting device selection, size, and/or positioning for a given project, proper selection of a protective cover blank, proper positioning and securing of a protective cover blank to a cutting mat, etc.). For example, a user may select a user-selectable object presented at the user interface which causes the user interface to display a selection of calibration options, instructions, and/or procedures, such as the option to send cutting test instructions to the cutting machine 146.

In some embodiments, the remote location 140 includes a blank identification module 144e configured to obtain information corresponding to a given protective cover blank, such as the unique identifier the given protective cover blank has been tagged with. For example, some embodiments of protective cover blanks include a machine-readable code from which the unique identifier associated with the protective cover blank may be obtained. In such embodiments, the blank identification module can operate in conjunction with suitable hardware (e.g., camera, scanner, etc.) to obtain the unique identifier from the protective cover blank. For example, a camera associated with the computing system may be used to read a QR code stamped, printed, or otherwise positioned on a given protective cover blank. In some embodiments, the unique identifier can then be sent to the cloud-based service 120 in order for the cloud-based service 120 to validate the protective cover blank.

The remote location 140 can also include a device request module 144d configured to receive a user supplied personal device request and to work in conjunction with a prototyping module 124b of the cloud-based service 120 that is configured to receive the personal device request. For example, if a user at remote location 140 desires a protective cover for a personal device that has no corresponding protective cover records 122e stored at the cloud-based service 120 (e.g., the personal device is new and/or uncommon), the user may input a personal device request at the remote location 140. In some embodiments, for example, the computing system at the remote location 140 can include hardware for receiving imagery, dimensions, and/or other information about the device to be requested (e.g., a scanner, camera, etc.). Some embodiments may also include an overlay or other size indicator used in conjunction with the scanner, camera, or the like. For example, the remote location 140 may include a scanner with an overlay indicating dimensions (e.g., grid lines) and optionally indicators for proper positioning of a personal device to be requested upon the overlay prior to scanning. Upon scanning or otherwise obtaining the personal advice information, the device request module 144d can send the information to the cloud-based service 120. The prototyping module 124b of the cloud-based service can then operate to store the information in protective cover records 122*e* and/or activity logs 122*d*. Additionally, or alternatively, the prototyping module 124*b* can flag the received request for review by an operator (e.g., a designer who can prepare suitable design files based on the request) and/or can send the request to manufacturer 130 or other potentially interested parties.

Though the embodiments illustrated by FIG. 1 show certain modules and storage items at certain locations within the computing architecture 100, it will be understood that in other embodiments, certain modules may be moved to other locations, and certain data may be stored in different locations or in more than one location. For example, in some embodiments, calibration module 144*c* can be handled by the cloud-based service 120. In some embodiments, some or all of the translation, materials matching, materials validation, and/or validation bypass processing can be handled at the remote location (140, 150), and relevant data, such as blank identifier records, protective cover records, activity logs, etc. can be stored at the storage 142 of the remote location 140 in lieu of or in addition to being stored at the cloud-based service 120.

Figure 2:
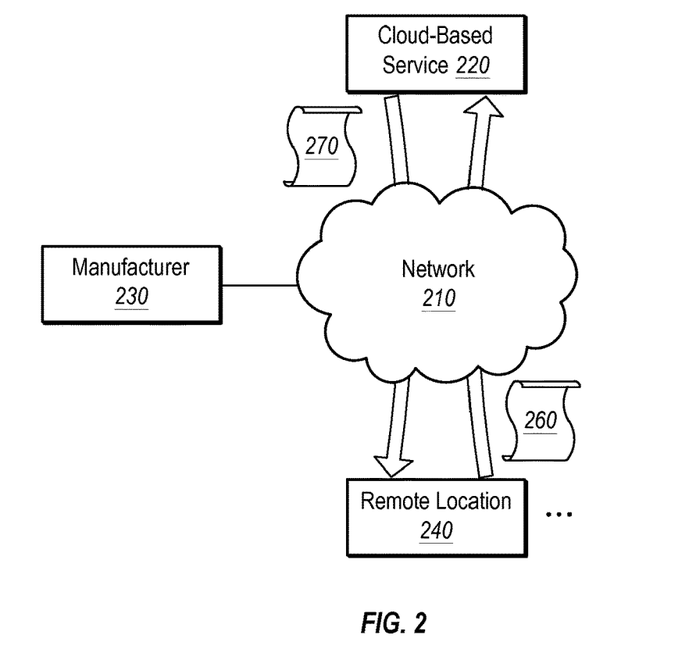
FIG. 2 illustrates a computing environment in which data is transferred between a cloud-based service and a remote location.

FIG. 2 illustrates an example of data transfer between a cloud-based service 220 and a remote location 240 using network 210. Data 260 may be sent from the remote location 240 to the cloud-based service 220, and data 270 may be sent from the cloud-based service 220 to the remote location 240. Data 260 and 270 may include instructions or information related to any of the functions and processes discussed above with reference to FIG. 1. For example, data 260 may include cutting machine identification data, such as cutting machine serial number(s), geographic location information, and user/business information. Data 260 may also include an update query or request, information related to a selected personal device, information related to a protective cover blank (e.g., a unique identifier associated with the protective cover blank), a materials validation bypass request, additional information related to the bypass request (e.g., a digital image of the protective cover blank), cut confirmation messages, a personal device request, a help/troubleshooting request, activity logs (related to cutting machine run time, number and types of cuts requested and made, types of protective cover blanks used, calibration information, etc.), and any other information transferred from the remote location 240 to the cloud-based service 220 related to the systems and methods described herein.

Data 270, for example, may include an approval message or a proceed instruction (e.g., following successful materials validation and/or cutting machine identification), update data, instructions indicating the set of suitable protective cover blanks for a particular selected personal device, cutting instructions, disable and/or lockout instructions (e.g., following an unsuccessful cutting machine and/or materials validation or an unsuccessful bypass attempt), a cut approval acknowledgement or instructions to initiate a troubleshooting process, and any other information transferred from the cloud-based service 220 to the remote location 240 related to the systems and methods described herein.

Figure 3:
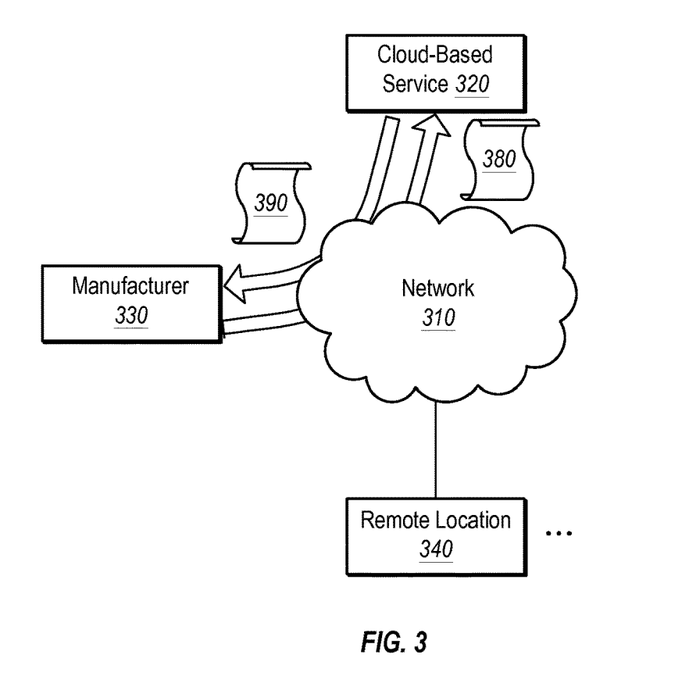
FIG. 3 illustrates a computing environment in which data is transferred between a manufacturer computer system and a cloud-service.

FIG. 3 illustrates an example of data transfer between a cloud-based service 320 and a computer system of a manufacturer 330 using network 310. Data 380 may be sent from the manufacturer 330 to the cloud-based service 320, and data 390 may be sent from the cloud-based service 320 to the manufacturer 330. Data 380 may include, for example, blank identifier records (e.g., unique identifier information associated with each protective cover blank) and cutting machine records (e.g., serial numbers, subscription and/or lease information associated with a given cutting machine, geographic location information, etc.). Data 390 may include, for example, activity logs (related to cutting machine run time, number and types of cuts requested and made, types of protective cover blanks used, calibration information, etc.). Additionally, or as part of the activity logs, data 390 may include materials validation data, cutting machine identification data, and/or bypass data. For example, data 390 may include information related to materials validation and/or bypass attempts that have been flagged by the cloud-based service 320 as suspicious, potentially suspicious, or otherwise noteworthy (e.g., as important to and/or requested by the manufacturer 330).

Figure 4:
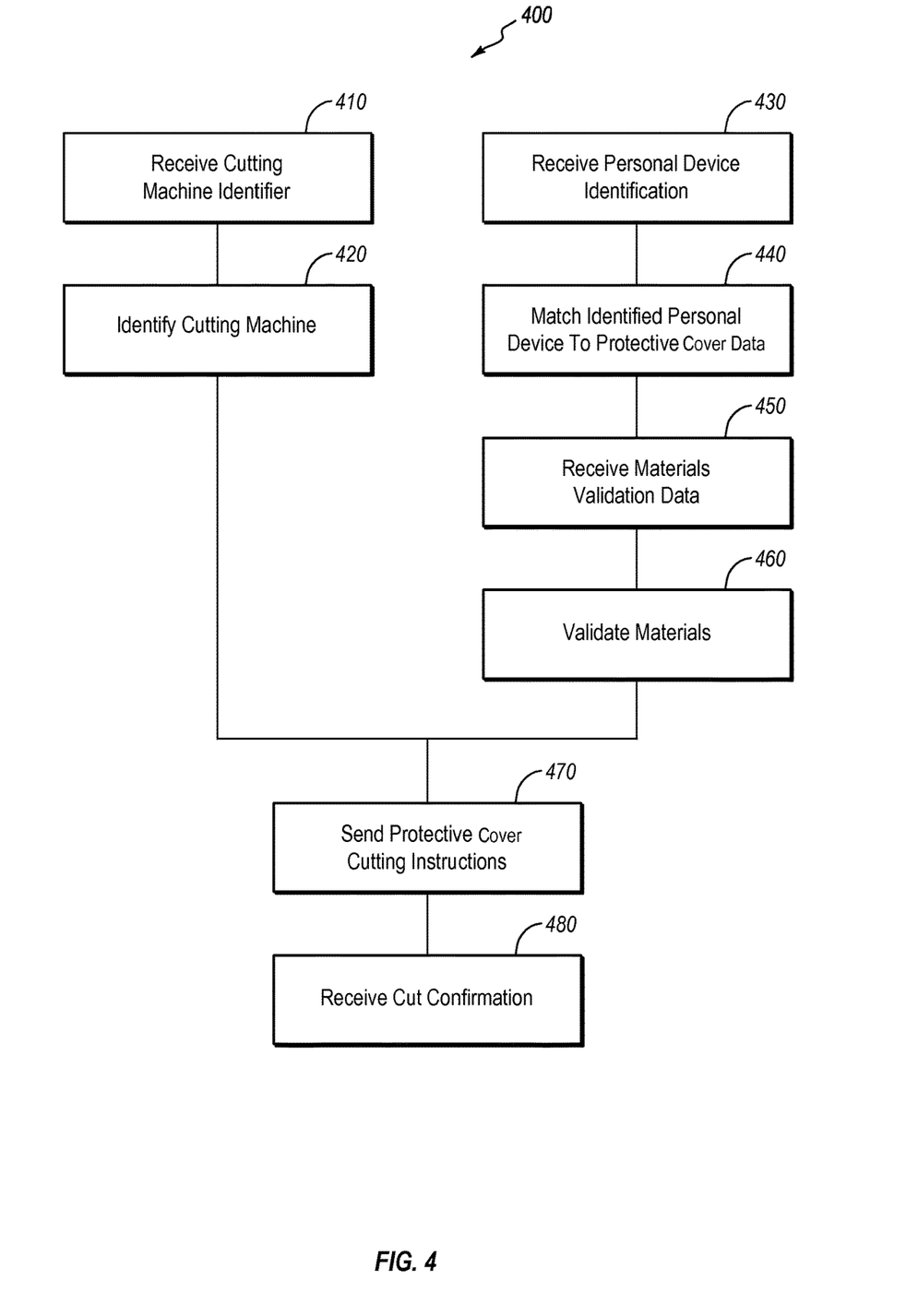
FIG. 4 illustrates a method of validating protective cover materials and sending protective cover cutting instructions.

FIG. 4 illustrates a method 400 of identifying a cutting machine, validating protective cover materials, and sending protective cover cutting instructions to a remote location. In the illustrated embodiment, a computer system, such as a cloud-based service, can receive a cutting machine identifier 410 and use the received identifier to identify a cutting machine 420. Prior, concurrently, or subsequent to this, the computer system can receive a personal device type identification 430, can match the identified personal device to protective cover data 440 (e.g., can match a given type of personal device to the set of types of protective cover blanks suitable for the device), can receive materials validation data 450 (e.g., can receive a unique identifier associated with a protective cover blank present at a remote location), and can validate the materials 460 based on the received materials validation data such as by checking a received unique identifier against blank identifier records to determine if the particular protective cover blank is authorized for the particular use at hand (e.g., based on the unique identifier, validating that the protective cover blank is an authorized protective cover blank).

After identifying the cutting machine 420 and validating the materials 460, the computer system can send protective cover cutting instructions 470 to a remote location (e.g., based on the personal device type identification, and based on the protective cover blank being an authorized protective cover blank, sending cutting instructions to the remote location, the remote location including a cutting machine, the cutting instructions instructing the cutting machine how to transform the protective cover blank by cutting the protective cover blank so that it fits a device of the personal device type). The computer system can then receive a cut confirmation 480 indicating that a protective cover was cut successfully. Alternatively, the computer system can receive a cut error/failure message and can optionally send an acknowledgement and/or initiate a troubleshooting process.

Figure 5:
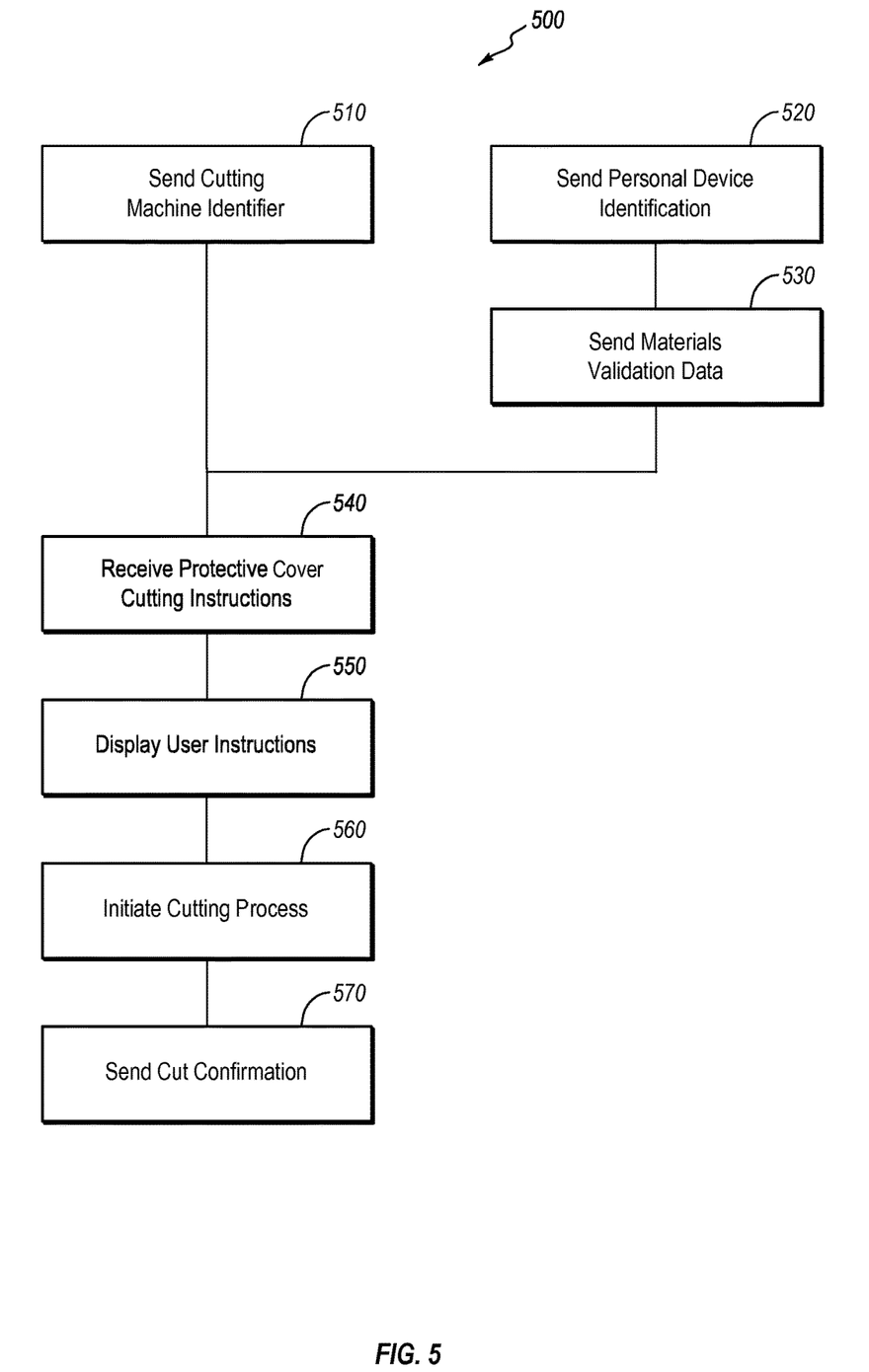
FIG. 5 illustrates a method of validating protective cover materials, receiving cutting instructions, and cutting a protective cover according to an identified type of personal device.

FIG. 5 illustrates a method 500 of validating protective cover materials, receiving cutting instructions, and transforming a protective cover blank into a protective cover using a cutting machine. In the illustrated embodiment, a computer system, in communication with a cutting machine, can send a cutting machine identifier 510 to a server computer system (such as to a cloud-based service). Prior, concurrently, or subsequent to this, the computer system can send a personal device identification 520 (e.g., an identification associated with a user selected personal device type selected using a user interface of the computer system) and materials validation data 530 (e.g., by scanning a machine-readable code containing a unique identifier for a protective cover blank) to the server computer system. For example, the method 500 may include presenting, at a user interface, a plurality of different personal device types that are associated with available protective covers, receiving, at the user interface, a selection of a particular one of the plurality of different personal device types, receiving a unique identifier associated with a protective cover blank, sending, to a server computer system, a personal device type identification corresponding to the particular one of the plurality of different personal device types, and sending, to the server computer system, the unique identifier associated with the protective cover blank.

The computer system can then receive protective cover cutting instructions 540 from the server computer system. For example, the method 500 may include, based on sending the personal device type identification and the unique identifier to the server computer system, receiving cutting instructions for cutting the protective cover blank according to protective cover data associated with the personal device type identification. Additionally, based on the received cutting instructions, the computer system can display user instructions 550 related to checking and/or preparing the cutting machine (including blades and other components), attaching the protective cover blank to a cutting mat (see FIG. 7 and related description), inserting the cutting mat, etc. The computer system can then initiate the cutting process 560 by sending the cutting instructions to the cutting machine. For example, the method 500 may include sending the cutting instructions to a cutting machine, causing the cutting machine to transform the protective cover blank by cutting the protective cover blank so that it fits the particular one of the plurality of different personal device types.

Figure 7:
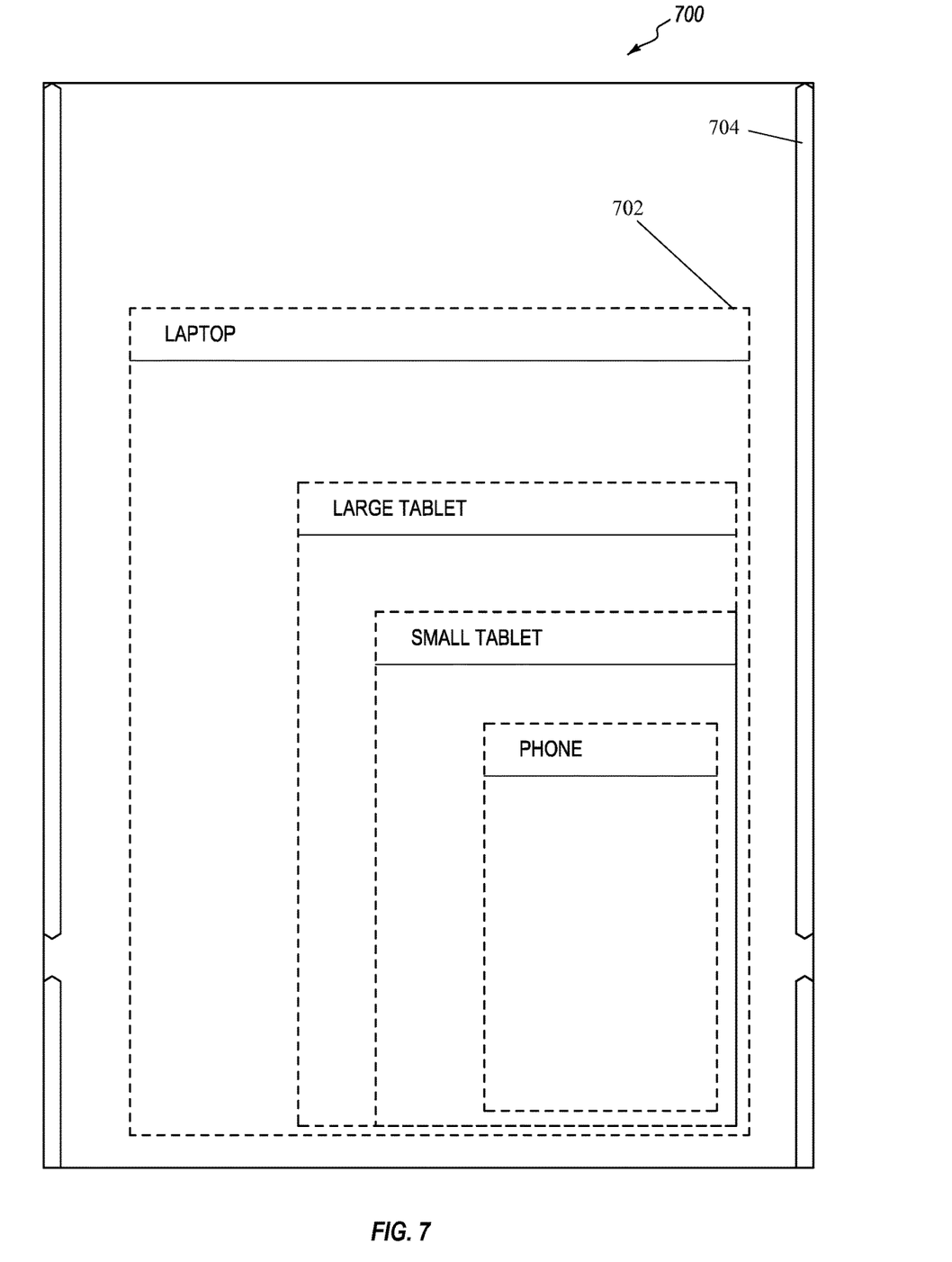
FIG. 7 illustrates a cutting mat suitable for receiving a protective cover blank and for being received into a cutting machine.

Once the cutting mat is inserted into the cutting machine and the cutting process is initiated, the cutting machine may identify an edge of the mat or at least two perpendicular edges of the mat. Based on the identified edge(s), a zero coordinate for cutting a design can be computed. In some embodiments, the cutting instructions are formulated to cut based on the computed zero coordinate. As shown in FIG. 7 and explained further below, the cutting mat may include position guides indicating proper placement of a protective cover blank so as to be properly positioned relative to the computed zero coordinate. After the cutting process, the computer system can optionally send a cut confirmation 570 to the server, or can send a failure/error message and/or request for troubleshooting instructions.

Figure 6:
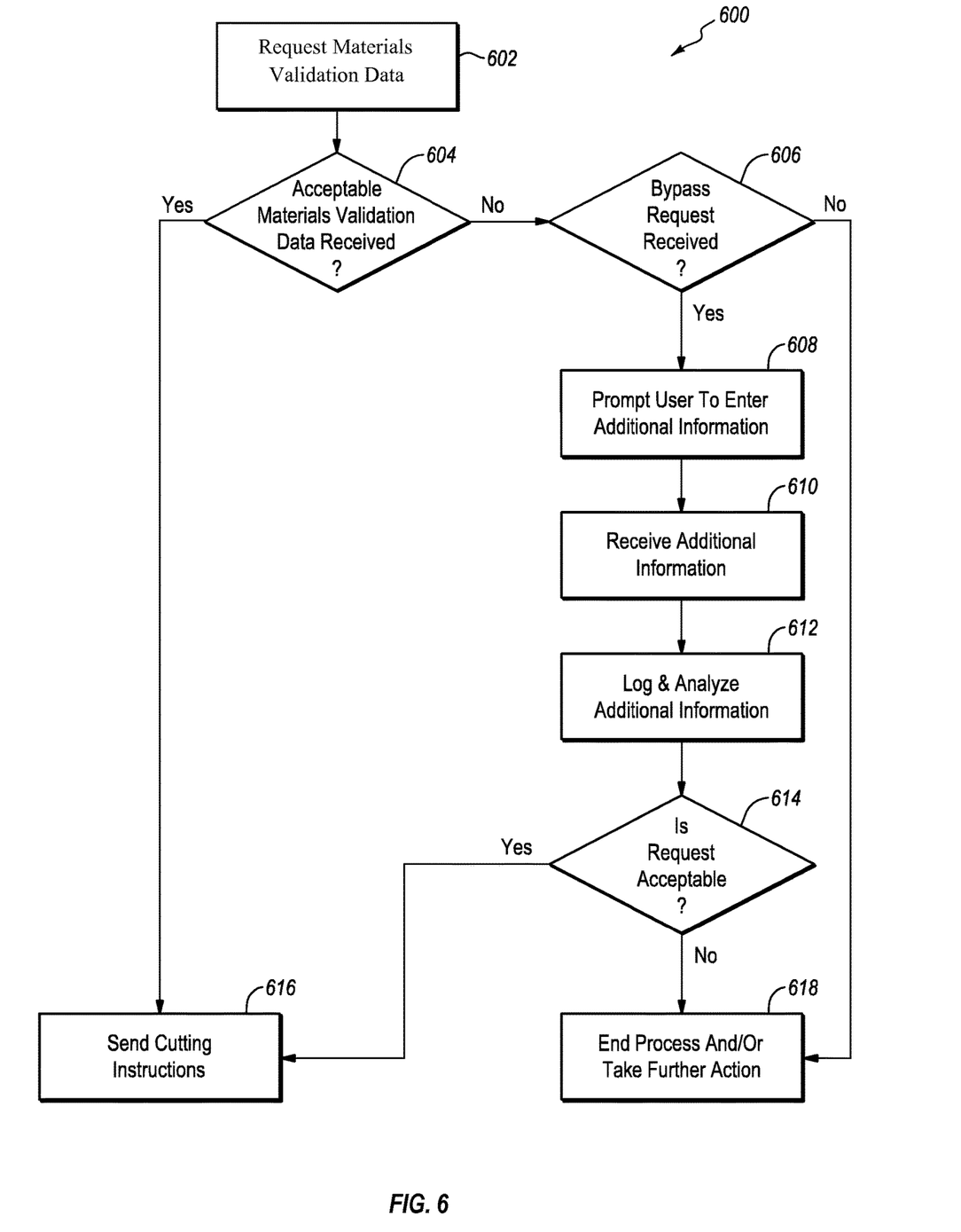
FIG. 6 illustrates a method of validating or rejecting a protective cover blank.

FIG. 6 illustrates a method 600 of validating materials. A computer system, such as a cloud-based service, can request materials validation data 602. The computer system then determines whether acceptable materials validation data has been received 604. For example, the computer system may compare the received information to stored materials records to determine if the particular materials are authorized for use under the circumstances requested (e.g., whether they are single-use only, whether they are appropriate for the identified cutting machine, geographic area and/or user, whether they are appropriate for the selected personal device for which a protective cover is desired, etc.). If the materials validation data is acceptable, the computer system can then approve the materials for the requested use and send cutting instructions 616. If materials validation data is not acceptable (or if none is received), the computer system can then determine whether a bypass request has been received 606. If no bypass request is received, the computer may end the process and/or take further action 618. For example, the computer may lock or disable the remote location computer system and/or may flag the request as suspicious. If a bypass request is received, the computer can then prompt a user to enter additional information 608. Additional information may include, for example, a user entered description of the problem and/or a photograph of the materials at issue. After receiving the additional information 610, the information can be logged and analyzed 612. The information may be flagged for review by an operator, may be sent to a manufacturer, and/or may be categorized according to pre-defined criteria. Based on the additional information, the computer system can then determine if the bypass request is acceptable 614. This may be done, for example, according to pre-defined criteria (e.g., number of previous bypass requests by this user and/or from this location, number of bypass requests within a given timeframe, type of additional information received, etc.) or may be done after being flagged and reviewed by an operator. If the bypass request is acceptable, the computer can send cutting instructions 616, if it is not acceptable, it may end the process and/or take further action 618.

FIG. 7 illustrates an example of a cutting mat 700 that may be used in accordance with the systems and methods of the present disclosure. Cutting mat 700 may include one or more position guides 702 configured to identify proper positioning of a protective cover blank onto the cutting mat 700 prior to cutting of the protective cover blank. As shown by the Figure, the position guides 702 may be arranged by personal device type (e.g., laptop, large tablet, small tablet, phone, etc.). In some embodiments, one or more of such position guides 702 may be omitted, or in other embodiments, additional position guides 702 may be included (e.g., for protective cover blanks associated with smart watches, GPS units, cameras, eReaders, mp3 players, etc.). The cutting mat may also include alignment guides 704 configured to identify proper positioning of the cutting mat 700 into the cutting machine. For example, a typical cutting machine may include rollers that operate to feed a cutting mat into the cutting area. Alignment guides 704 may be configured to align with such rollers to clearly indicate proper positioning of the cutting mat into the cutting machine, thereby helping to prevent user error in aligning blanks and ensuring that a blank is always positioned at a known location on the mat (such as in relation to the computed zero coordinate). In some embodiments, the mat is comprised of a sticky material, for use in securing blanks to the mat. However, use of a sticky mat reduces the lifespan of the mat and makes application of the blank to the mat more difficult. In other embodiments, the blanks are secured to the mat using non-residue adhesive strips, such as acrylic removable adhesive strips (see the illustrated instructions of the user interface 1300 of FIG. 13). For example, two or four adhesive strips can be applied to a blank (e.g. one on each side, or one on opposing sides), and then the blank can be temporarily adhered to the mat.

Figure 8:
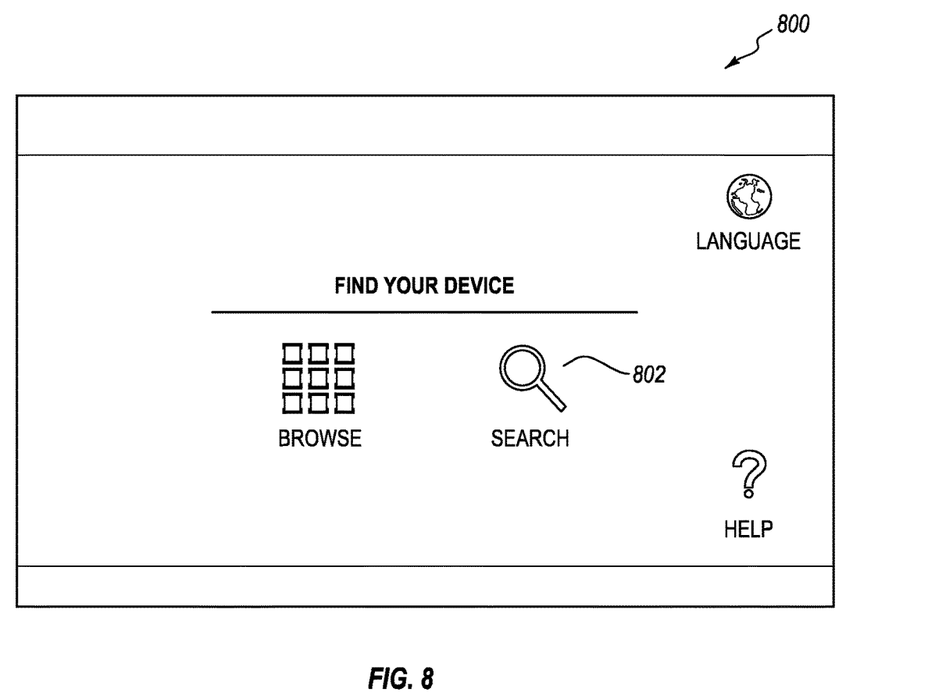
FIGS. 8-15 illustrate different examples of user interfaces that can be presented to a user during a materials selection, validation, and/or cutting process or other process.

FIGS. 8-15 illustrate embodiments of user interfaces that can, for example, be presented, on a display device, to a user by a computer system of the present disclosure and/or by a computer system carrying out a method of the present disclosure. FIG. 8 illustrates user interface 800, which may include a plurality of user-selectable objects, such as user-selectable object 802. The user interface 800 allows a user to search for a personal device for which a protective cover is desired. For example, the user interface 800 may include user-selectable objects allowing a user to browse for the desired personal device (e.g., by browsing through lists organized by device type, manufacturer, alphabetical listing, popularity, release date, etc.), or by searching (e.g., keyword search). Additionally, the user interface 800 can include other options (e.g., help, language, etc.).

Figure 9:
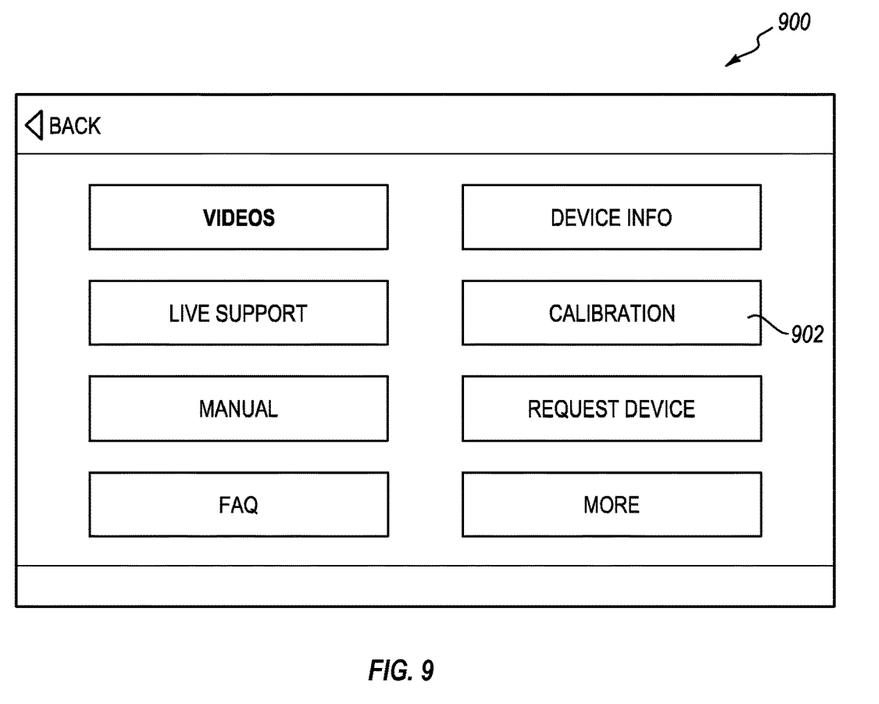

FIG. 9 illustrates an embodiment of a user interface 900 displaying a list of options presented as user-selectable objects (such as user-selectable object 902). Options may include links to instructional videos (e.g., showing blade calibration and/or positioning, cutting machine operation, cutting mat placement, cutting machine serial number location, etc.), a live support option configured to initiate a live support connection or instruct a user on how to initiate a connection, user manual access, frequently asked questions and/or troubleshooting information, device information (e.g., cutting machine usage, model, etc.), a calibration option configured to initiate a calibration process upon user selection (e.g., running a test cut, adjusting blades, etc.), a device request option, and other such options.

Figure 10:
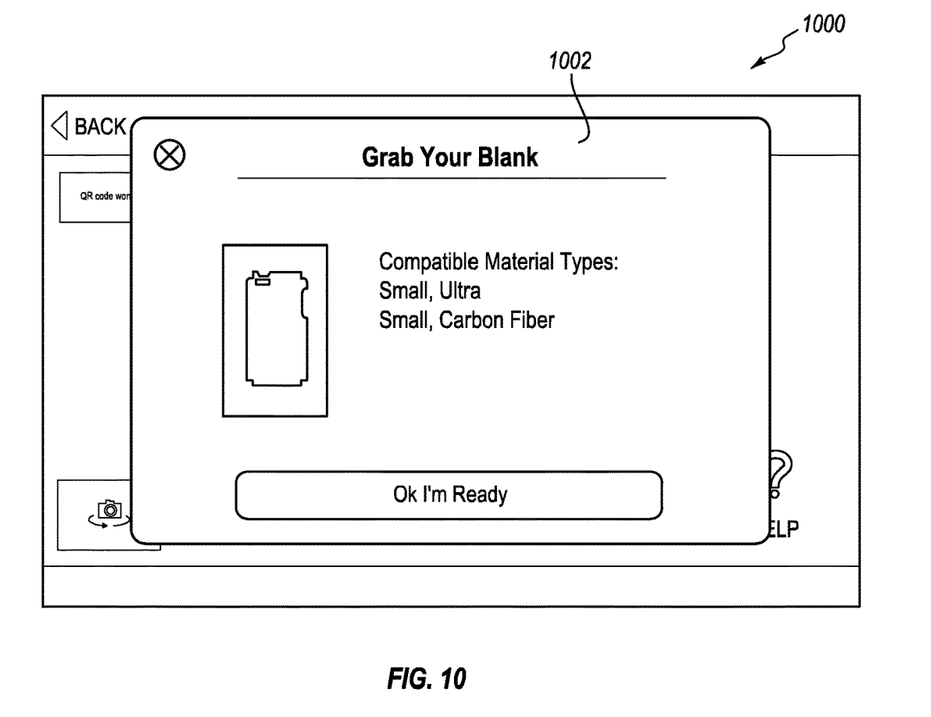

FIG. 10 illustrates an embodiment of a user interface 1000 displaying an information box 1002 listing compatible material types based on a user's selection of a personal device for which a protective cover is desired. For example, for the selected personal device, the information box 1002 displays a list of two compatible material types (i.e., protective cover blank types) from which the desired protective cover may be cut.

Figure 11:
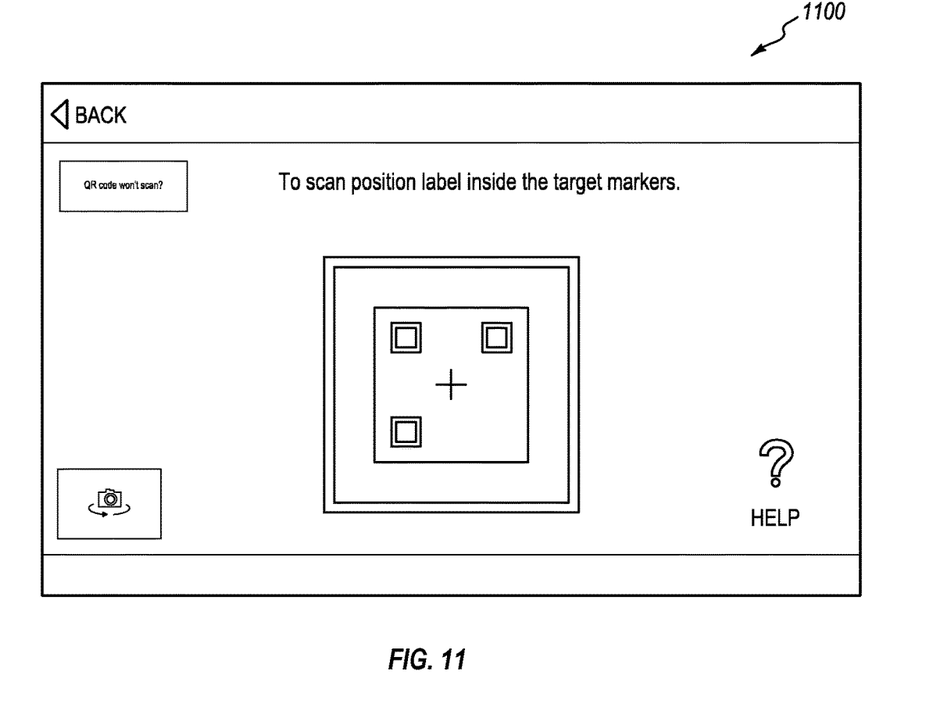

FIG. 11 illustrates an embodiment of a user interface 1100 during the obtaining of a protective cover blank identifier. In the illustrated example, the user interface 1100 instructs a user to find and scan a QR code located on the selected protective cover blank.

Figure 12:
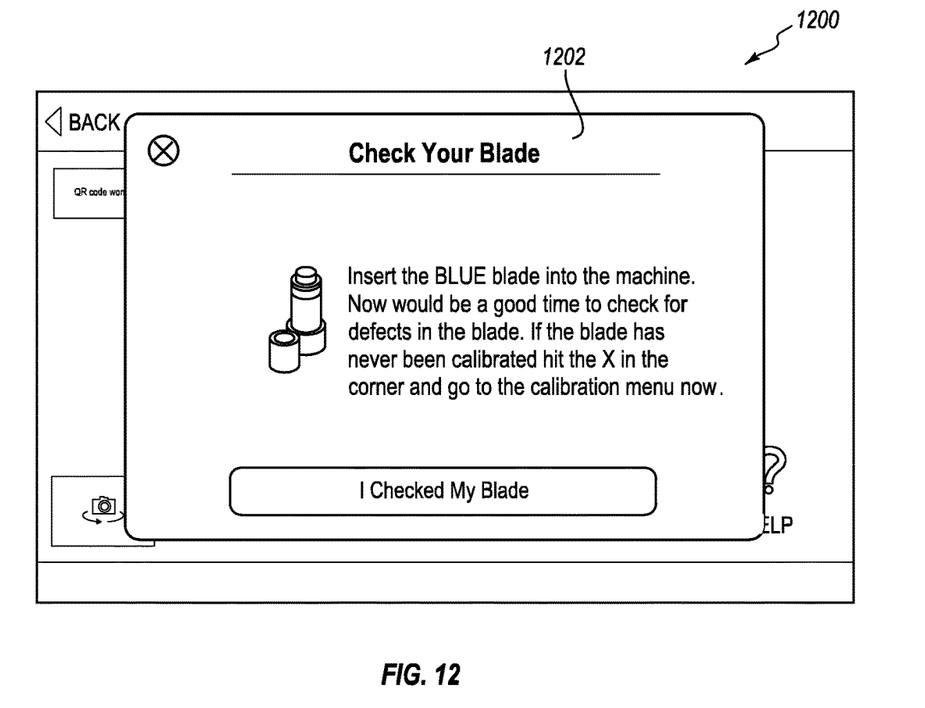

FIG. 12 illustrates an embodiment of a user interface 1200 displaying an information box 1202 providing user instructions for preparing the cutting machine for cutting the protective cover. For example, some types of cutting machines may include different cutting blades (e.g., which may be color-coded). Based received cutting instructions, the user interface 1200 instructs the user on the proper selection of cutting blade, and in some embodiments, may provide a reminder to calibrate the cutting blades prior to cutting the protective cover.

Figure 13:
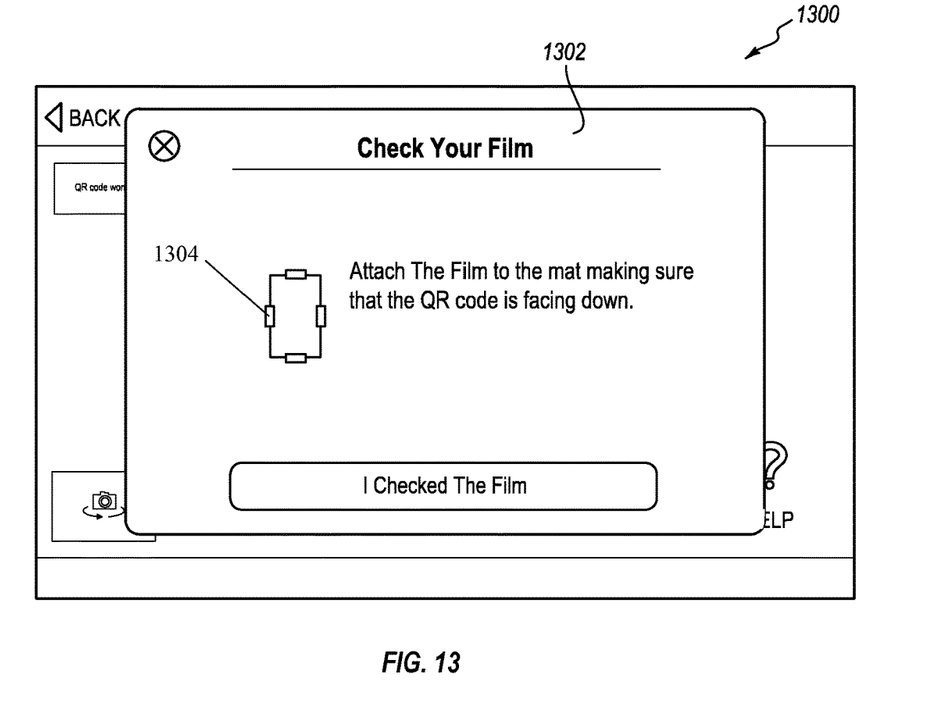

FIG. 13 illustrates an embodiment of a user interface 1300 including an information box 1302 providing user instructions for properly attaching the protective cover blank to the cutting mat. For example, the information box 1302 may include instructions describing and/or showing the proper orientation of the protective cover relative to the cutting mat. The information box 1302 may also explain and/or illustrate the proper placement of adhesive strips 1304 to secure the protective cover blank to the cutting mat (e.g., to sufficiently secure the cover to the mat without interfering with the cutting of the cover).

Figure 14:
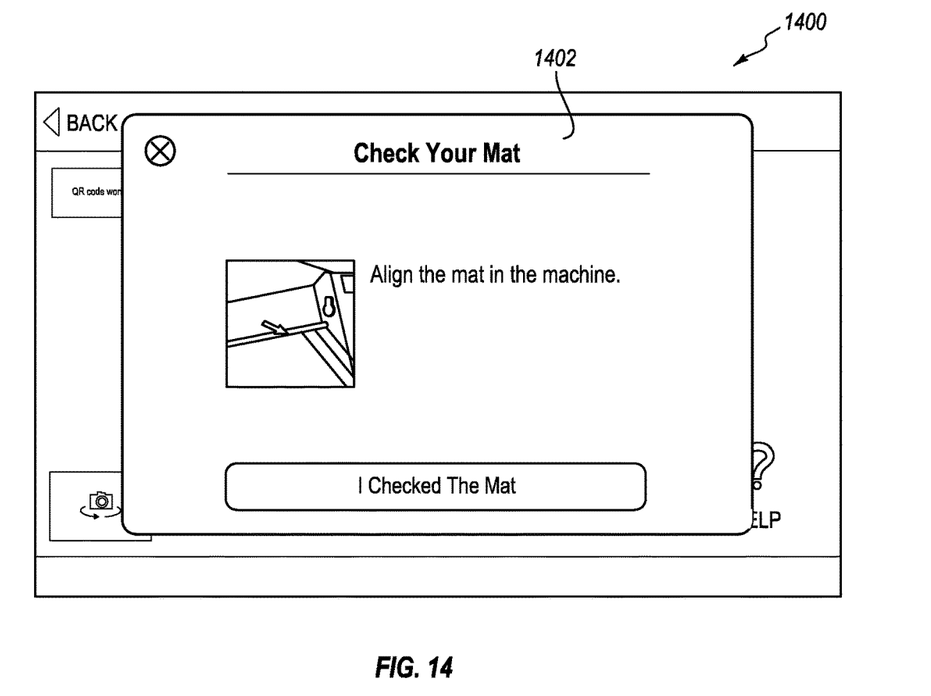

FIG. 14 illustrates an embodiment of a user interface 1400 including an information box 1402 providing user instructions for properly positioning the cutting mat within (or to be fed within) the cutting machine. For example, the cutting mat may include alignment guides configured to align with rollers or other feed mechanisms or indicators of a cutting machine, and the information box 1402 may explain and/or illustrate proper alignment of the alignment guides relative to the cutting machine.

Figure 15:
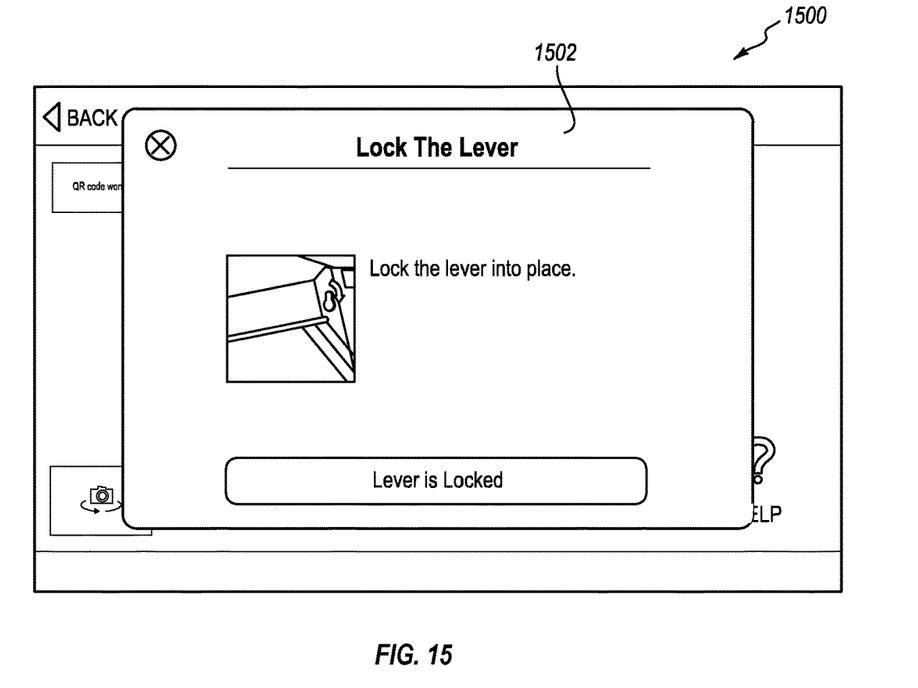

FIG. 15 illustrates another embodiment of a user interface 1500 including an information box 1502. In some embodiments, the relevant cutting machine may include a locking mechanism required to be adjusted or actuated prior to starting the cutting process. The information box 1502 can explain and/or illustrate how to carry out such setup procedures prior to initiating the cutting process.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, of validating protective cover materials and communicating protective cover cutting instructions to a cutting machine at a remote location, the method comprising:
receiving a personal device type identification;
receiving a unique identifier associated with a machine readable code located on a protective cover blank present at the remote location;
based on the unique identifier, validating that the protective cover blank is an authorized protective cover blank, wherein validating that the protective cover blank is an authorized blank includes comparing the unique identifier to activity logs and/or protective cover blank identification records, wherein the protective cover blank identification records include a member selected from the group consisting of:
whether the protective cover blank is for single-use only, whether the protective cover blank is appropriate for a geographic area, and whether protective cover blank is appropriate for the personal device type identification;
based on the personal device type identification, and based on the protective cover blank being an authorized protective cover blank, sending cutting instructions to the cutting machine at the remote location, the cutting instructions instructing the cutting machine how to transform the protective cover blank by cutting the protective cover blank so that it fits a device of the personal device type identification; and cutting the protective cover blank using the cutting machine.

2. The method of claim 1, further comprising receiving a cutting machine identifier and identifying the cutting machine prior to sending the cutting instructions to the cutting machine.

3. The method of claim 2, further comprising receiving one or more of a user identifier or a geographic identification information and associating the one or more of the user identifier or the geographic identification information with the cutting machine identifier to identify the cutting machine.

4. The method of claim 1, further comprising, after receiving the personal device type identification, sending a list of suitable protective cover blank types according to the personal device type.

5. The method of claim 1, wherein the unique identifier is obtained from a machine readable code located on the protective cover blank.

6. The method of claim 1, wherein validating that the protective cover blank is an authorized blank comprises receiving a bypass request and sending a prompt requesting a photograph of the protective cover blank.

7. The method of claim 6, wherein validating that the protective cover blank is an authorized blank further comprises receiving the photograph of the protective cover blank and comparing the photograph to activity logs and/or protective cover blank identification records.

8. A method, implemented at a computer system that includes one or more processors, the computer system being communicatively coupled to a cutting machine, of cutting a protective cover for a personal device, the method comprising:
presenting, at a user interface, a plurality of different personal device types that are associated with available protective covers; receiving, at the user interface, a selection of a particular one of the plurality of different personal device types;
receiving a unique identifier associated with a machine readable code located on a protective cover blank;
sending, to a server computer system, a personal device type identification corresponding to the particular one of the plurality of different personal device types;
sending, to the server computer system, the unique identifier associated with the protective cover blank;

based on sending the personal device type identification and the unique identifier to the server computer system, validating that the protective cover blank is an authorized blank by comparing the unique identifier to activity logs and/or protective cover blank identification records, wherein the protective cover blank identification records include a member selected from the group consisting of: whether the protective cover blank is for single-use only, whether the protective cover blank is appropriate for a geographic area, and whether protective cover blank is appropriate for the personal device type identification;

receiving cutting instructions for cutting the protective cover blank according to protective cover data associated with the personal device type identification when the protective cover blank is an authorized blank; and sending the cutting instructions to the cutting machine, causing the cutting machine to transform the protective cover blank by cutting the protective cover blank so that it fits the particular one of the plurality of different personal device types.

9. The method of claim 8, further comprising sending, to the server computer system, a cutting machine identifier prior to receiving cutting instructions for cutting the protective cover blank.

10. The method of claim 8, wherein the sending, to the server computer system, the unique identifier associated with the protective cover blank comprises scanning the machine-readable code in order to obtain the unique identifier.

11. The method of claim 8, further comprising, after receiving at the user interface a selection of the particular one of the plurality of different personal device types, presenting at the user interface a list of types of protective cover blanks appropriate for the particular one of the plurality of different personal device types.

12. The method of claim 8, further comprising, after sending to the server computer system the unique identifier associated with the protective cover blank, sending a bypass request to the server computer system and receiving a prompt requesting a photograph of the protective cover blank.

13. The method of claim 8, further comprising, after receiving cutting instructions for cutting the protective cover blank, displaying, at the user interface, user instructions for preparing the cutting machine and protective cover blank for cutting of the protective cover blank.

14. The method of claim 13, wherein the user instructions include blade type and or blade adjustment instructions.

15. The method of claim 13, wherein the user instructions include instructions for positioning the protective cover blank onto a cutting mat.

16. The method of claim 15, wherein the user instructions further include instructions for positioning the cutting mat into the cutting machine.

17. A system for validating protective cover materials and for cutting a protective cover for a personal device, the system comprising:

a client computer system comprising one or more processors and one or more hardware storage devices; and a server computer system comprising one or more processors and one or more hardware storage devices;

wherein the client computer system includes computer-executable instructions stored on the one or more hardware storage devices of the client computer system that are configured to present, at a user interface, a plurality of different personal device types that are associated with available protective covers; to receive, at the user interface, a selection of a particular one of the plurality of different personal device types and to receive a unique identifier associated with a machine readable code located on a protective cover blank; to send to the server computer system a personal device type identification corresponding to the particular one of the plurality of different personal device types and the unique identifier associated with the protective cover blank; to receive cutting instructions from the server computer system for cutting the protective cover blank according to protective cover data associated with the personal device type identification; and to send the cutting instructions to a cutting machine causing the cutting machine to transform the protective cover blank by cutting the protective cover blank so that it fits the particular one of the plurality of different personal device types; and wherein the server computer system includes computer-executable instructions stored on the one or more hardware storage devices of the server computer system that are configured to receive the personal device type identification and the unique identifier associated with the protective cover blank from the client computer system, and based on the unique identifier, to validate that the protective cover blank is an authorized protective cover blank by comparing the unique identifier to activity logs and/or protective cover blank identification records, wherein the protective cover blank identification records include a member selected from the group consisting of: whether the protective cover blank is for single-use only, whether the protective cover blank is appropriate for a geographic area, and whether protective cover blank is appropriate for the personal device type identification, and based on the personal device type identification and the protective cover blank being an authorized protective cover blank, to send the cutting instructions to the client computer system.

18. The system of claim 17, further comprising a manufacturer computer system configured to send protective cover blank identification records to the server computer system, the protective cover blank identification records allowing the server computer system to validate that the protective cover blank is an authorized protective cover blank by comparing the protective cover blank identification records with the unique identifier received from the client computer system.

19. The method of claim 1, wherein the protective cover blank identification records include whether the protective cover blank is appropriate for a geographic area.

* * * * *